Feb. 28, 1967 E. M. WALTERS 3,307,159

MAGNETIC SHIFT REGISTER CIRCUIT

Filed Sept. 18, 1963 2 Sheets-Sheet 1

INVENTOR
E. M. WALTERS
BY William H. Kamstra
ATTORNEY

United States Patent Office 3,307,159

Patented Feb. 28, 1967

3,307,159

MAGNETIC SHIFT REGISTER CIRCUIT

Edward M. Walters, Middlebush, N.J., assignor to Bell Telephone Laboratories, Incorporated, New York, N.Y., a corporation of New York Filed Sept. 18, 1963, Ser. No. 309,635
5 Claims. (Cl. 340—174)

Figure 1:
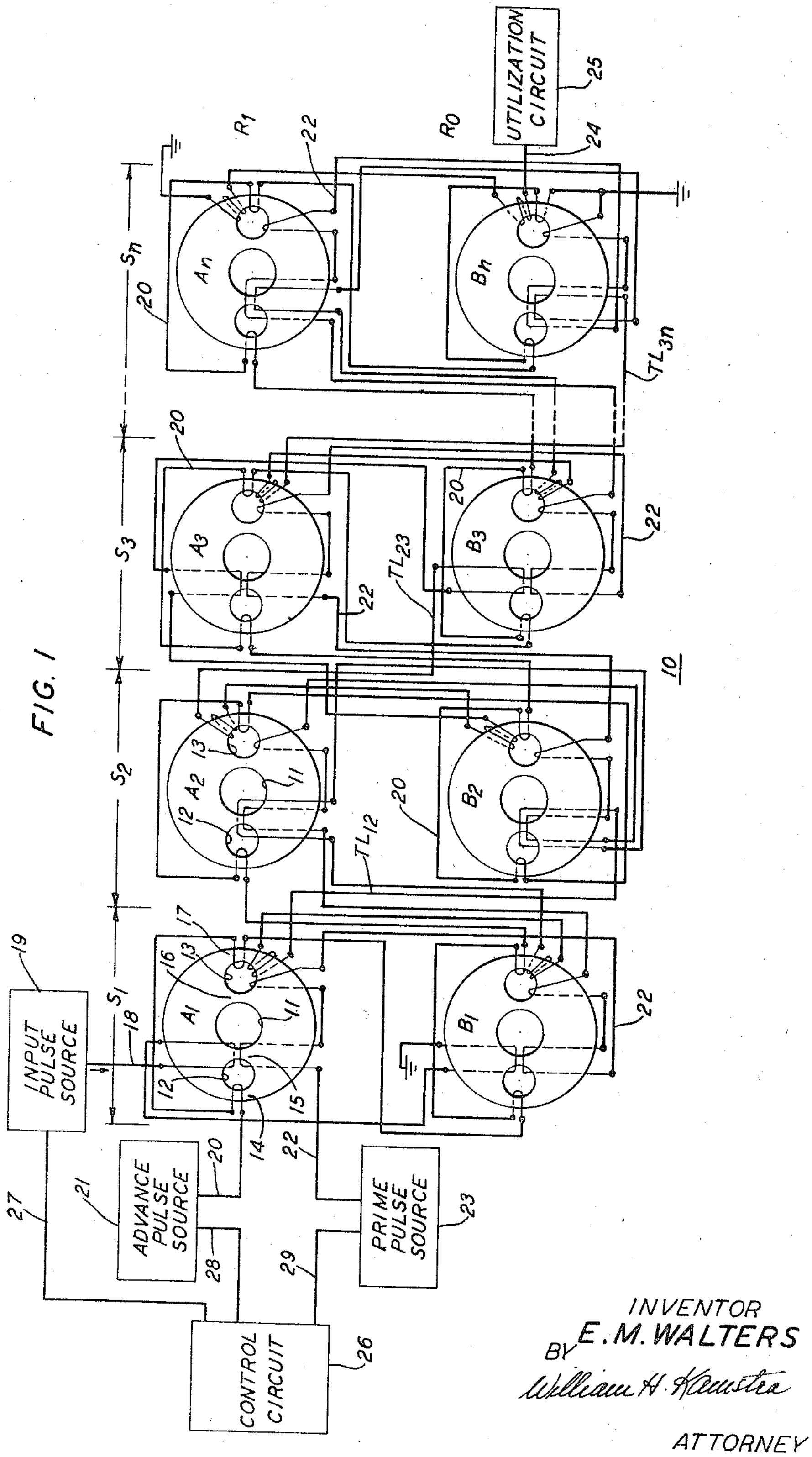

This invention relates to information handling circuits and more particularly to magnetic shift register circuits.

Circuits comprising, as far as possible, compatible rectangular loop magnetic devices, and having a capacity for memory, gain, and unidirectionality have many advantages which make them attractive as elements of information processing systems. These advantages include the relative low cost, small size, and high reliability of such devices as, for example, simple toroidal cores and multiapertured cores.

In one kind of information processing circuit, signals are propagated in a step-by-step fashion along a directed path a network of bit storage locations without signal degradation. One approach to the design of magnetic circuits of this kind requires interconnecting a number of simple toroidal cores by means of wires and associated components such as diodes. This approach, however, results frequently in considerable wiring complexity. The wiring complexity and the number of associated components required by these toroidal core circuits can be reduced often, and the efficiency of the individual circuits can be increased by using more complicated magnetic devices such as the multiapertured cores. One example of an information processing circuit using multiapertured cores is disclosed in Patent No. 3,045,215, of U. F. Gianola, issued July 17, 1962.

The Gianola patent describes a novel magnetic shift register each stage of which includes two multiapertured cores and two intercore coupling windings, commonly termed "transfer loops." Experience has shown that the cost of each transfer loop between the cores of such circuits represents a substantial part of the cost of the circuits. Moreover, the reliability of such circuits depends, to a large extent, on the solder connection required by each of these transfer loops. Accordingly, there is considerable merit to any approach which can reduce the total number of transfer loops needed.

The Gianola patent also describes a shift register wherein binary information is shifted from one core to another in two operative phases commonly termed the "prime" and the "advance" phase, the prime phase acting to shift information into the output portion of a core, the advance phase acting not only to shift information to the next succeeding core but also to "clear," that is, to drive to an informationless condition the next preceding core. Each phase of operation, however, usually requires its own driver and, in addition, is time consuming. Consequently, any reduction in the number of operative phases reduces the total number of drivers required and enables an increased operational repetition rate.

Accordingly, it is an object of this invention to provide a new and improved shift register which is, advantageously inexpensively and easily constructed and which is, further, highly reliable.

The objects of the present invention are realized in a specific illustrative multistage shift register including two multiapertured cores per stage arranged such that one core per stage is responsive to positive input signals only, and the other is responsive to negative input signals only in what is commonly termed a "double-rail" logic system. The two cores of each stage are coupled to the two cores of the next succeeding stage by a single transfer loop and a single advance circuit which permit, when the advance circuit is activated, the transfer of information between the coupled cores of adjacent stages responsive to like polarity signals, while urging toward a clear state all the remaining cores of the adjacent stages.

Accordingly, a feature of a shift register in accordance with this invention is a single transfer loop connecting the four cores of two adjacent stages.

Another feature of a shift register in accordance with this invention is a single advance and single prime circuit each coupling all the cores of the register and enabling a two-phase cycle of operation per stage.

Figure 2A:
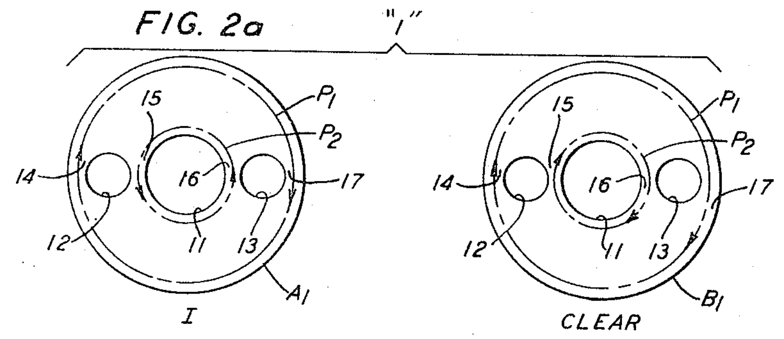
Figure 2B:
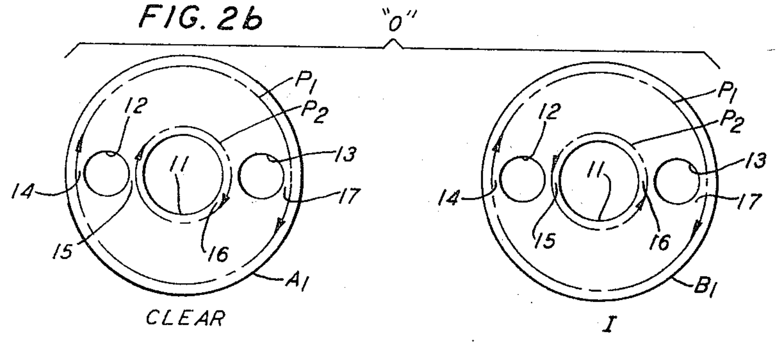
Figure 2C:
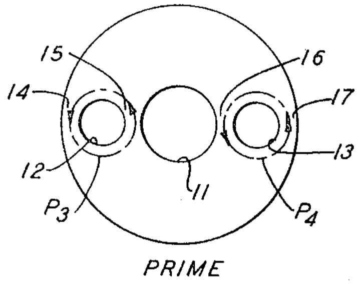
Figure 3:
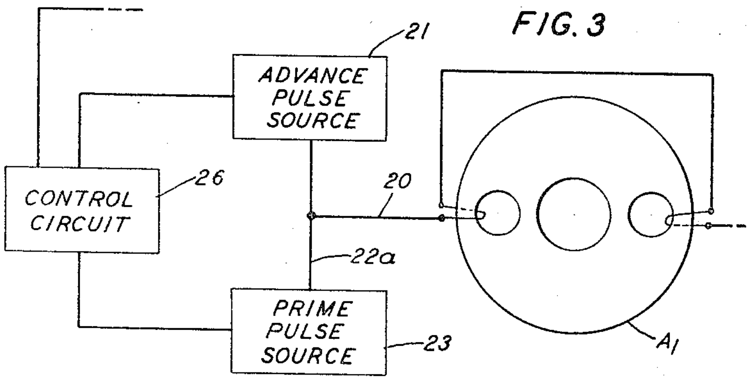

The invention together with the foregoing and other objects and features thereof will be better understood from a consideration of the detailed description of an illustrative embodiment thereof when taken in conjunction with the accompanying drawing, in which:

FIG. 1 is a schematic diagram of an illustrative magnetic shift register in accordance with this invention;

FIGS. 2*a*, 2*b* and 2*c* are schematic diagrams illustrating the possible flux conditions of the multiapertured cores and information represented thereby in accordance with this invention; and FIG. 3 is a schematic diagram of an initial portion of another specific magnetic shift register in accordance with this invention.

FIG. 1 shows a shift register 10 in accordance with this invention. The shift register comprises a sequence of stages $S_1$, $S_2$, $S_3$ . . . $S_n$. Each of these stages includes a conventional A and B multiapertured magnetic core, $A_1$, $A_2$, $A_3$ . . . $A_n$, $B_1$, $B_2$, $B_3$ . . . $B_n$, each having substantially rectangular hysteresis characteristics. Each core bears a subscript corresponding to that of its stage. The A and B cores comprise separate information channels, or rails as they are commonly termed, $R_1$ and $R_0$, for binary "1's" and "0's," respectively, as is described more fully hereinafter. Each magnetic core is apertured to provide a relatively large central hole 11 and two smaller radial holes 12 and 13. The holes form, in each magnetic core, generally vertical legs 14, 15, 16 and 17 having substantially equal minimum cross-sectional areas.

A conductor 18, coupling serially, in opposing sense, legs 15 of cores $A_1$ and $B_1$ of the first stage is connected between an input pulse source 19 and ground. A conductor 20, coupling serially, in an alternating sense, the legs 14 and 17 of the A and B cores of each stage of the register successively, is connected between an advance pulse source 21 and ground. A conductor 22, coupling serially, in a like sense, the legs 15 and 17 of the A and B cores of each stage of the register successively, is connected between a prime pulse source 23 and ground. A separate transfer loop TL, bearing subscripts indicating the shift register stages coupled thereby, couples the A and B cores of each pair of adjacent stages in the shift register. Specifically, each transfer loop couples serially, in opposing sense, the legs 17 of the A and B cores of one stage to the legs 15 of the A and B cores of the next succeeding stage. The coupling to the legs 15, as well as the coupling to the legs 17, also is serially, in opposing sense, as will become clear in the discussion of the operation of the shift register to follow. The transfer loop coupling the legs 17 of one stage and the legs 15 of the next succeeding stage have a turns ratio relationship of $n$:1 where $n$ is greater than one for maintaining sufficient gain in transferring information from stage to stage. The transfer loops, in addition, advantageously contain no other electrical elements and only the properties inherent in the loops, such as the internal resistance, will have any effect on the currents in the loops. A conductor 24, coupling serially, in opposing sense, legs 17 of cores $B_n$ and $A_n$ of the last stage, is connected between a utilization circuit 25 and ground. A control circuit 26 is connected to the input pulse source 19, the advance pulse source 21, and the prime pulse source 23 by means of conductors 27, 28, and 29, respectively.

In operation, the flux in the cores of the shift register 10 of FIG. 1 is driven into various configurations. FIG. 2*a* shows a respresentative two of such cores which are designated $A_1$ and $B_1$ for stage $S_1$ for convenience. Although so designated, they are representative of the two core arrangement of any stage in the register because all the A and B cores are taken to be identical. Each leg of the core includes an arrow as shown in the figure. The arrow represents the flux capacity of the leg, and since all the legs have equal minimum cross-sectional areas and, thus, equal flux-carrying capacity, all the arrows are shown as identical. The direction of the arrow, that is, upward or downward as viewed in the drawing with respect to the legs, indicates a positive remanent state or a negative remanent state respectively for the leg designated. When all the flux, in flux paths $P_1$ and $P_2$ through leg pairs 14 and 17 and 15 and 16, respectively, is in the clockwise direction about hole 11, that is, when the arrows in legs 14 and 15 are directed upward and the arrows in legs 16 and 17 are directed downward, the core is said to be in the clear state. The clear state is shown in core $B_1$ of FIG. 2*a* and, in and of itself, represents an informationless condition.

Information is stored in a core, in accordance with this embodiment, by varying the pattern of arrows in a core in one prescribed manner regardless of whether a binary "1" or a binary "0" is stored. It will become apparent hereinafter that the position of the varied flux pattern with respect to the position of the clear pattern in the A and B core of a particular stage, rather than the varied flux pattern alone, determines the binary value represented. Specifically, core $A_1$ in FIG. 2*a* shows the flux pattern for an information condition designated I as shown below the core $A_1$ in FIG. 2*a*. As shown, flux in flux path $P_1$ is directed clockwise around the central hole 11, and the flux in flux path $P_2$ is directed counterclockwise around central hole 11. That is, the flux arrows are directed upward in legs 14 and 16 and downward in legs 15 and 17. The information condition in an A core and the clear state in the B core of the same stage are taken collectively to represent a stored binary "1" as indicated in FIG. 2*a*. A binary "0" is represented by the clear state in an A core and the information condition in the B core of the same stage as shown in FIG. 2*b*. Thus, information is stored in the register by driving a core to the information condition. Whether this condition represents a "1" or a "0" depends on whether the information condition is in the A core and the B core is in a clear state, or vice versa, respectively.

FIG. 2*c* shows the information "primed" condition wherein the flux pattern is reversed from that representing the information condition. Specifically, in the primed condition, the flux in both legs 14 and 16 is directed downward while the flux in legs 15 and 17 is directed upward, that is, the flux in each of flux paths $P_3$ and $P_4$, through leg pairs 14 and 15, and 16 and 17 respectively, is directed counterclockwise about the radial holes 12 and 13.

The flux patterns of FIGS. 2*a*, 2*b* and 2*c* will be referred to in the following description of an illustrative operation of the shift register of FIG. 1. Preliminarily, it will be helpful to understand that the prime circuit is coupled to all the cores in the register by windings, the senses of which enable it, when activated, to switch only the cores in the information condition. The advance circuit is coupled to all the cores in the register by windings the senses of which enable it to switch, when activated, only the primed cores. Each transfer loop is coupled to each of the four cores of a pair of adjacent stages by windings the sense of which are such that the switching by means of the advance circuit, of one or the other core in one stage, induces, respectively, a positive or negative pulse in the associated transfer loop which pulse produces flux switching in only the corresponding core of the next adjacent stage. The efficacy of the transfer loop depends, to a large extent, on the fact that in accordance with this invention the information condition differs from the clear state only by the direction of flux in the flux path $P_2$, shown in FIG. 2*a*, to which the transfer loop alone is coupled and provides, when activated, switching thereabout. Thus the senses by which the transfer loop is coupled to the cores of the transferee stage determine the destination of the information being transferred therethrough. For one core of the transferee stage, the effect of the advance pulse and the pulse induced in the transfer loop thereby is the clear state; for the other core of the transferee stage, the effect is the information condition.

In light of the foregoing description of the organization and the introductory remarks concerning information representation and transfer in accordance with this invention, a description of an illustrative operation of the shift register of FIG. 1 will now be presented. In this connection illustrative binary representations 1, 0, 1 will be introduced successively into the shift register. In order to expedite the description, it is assumed that all the cores in the shift register are, initially, in the clear state as shown for core $B_1$ in FIG. 2*a*.

An operation is initiated by the simultaneous activation of both the input pulse source 19 and the advance pulse source 21 under the control of the control circuit 26. In this connection, input pulse source 19 may comprise any bipolar pulse source capable of providing suitable positive and negative pulses as required in accordance with this invention for providing the flux changes described herein. Similarly, advance pulse source 21 may comprise any unipolar pulse source capable of providing the flux changes required in accordance with this invention. Control circuit 26 may comprise any control circuit capable of activating the various pulse sources in accordance with this invention. In accordance with the illustrative information to be shifted through the register, input pulse source 19, at this time, provides in conductor 18 a positive input pulse which drives the flux in leg 15 of a core $A_1$ downward, flux closure being provided about path $P_2$ through leg 16, thus, placing core $A_1$ in the information condition shown in FIG. 2*a*. The input pulse also tends to drive the flux in leg 15 of core $B_1$ upward. Core $B_1$, however, is already in the clear state and the flux in its leg 15 already is directed upward. Thus, leg 15 of core $B_1$ is driven further into saturation by the input pulse, and the core remains in the clear state. Accordingly, there is stored in stage $S_1$ a binary "1" as shown in FIG. 2*a*.

Coincident with the input pulse in conductor 18, an advance pulse is provided in conductor 20 by the activation of advance pulse source 21. The advance pulse in conductor 20 tends to drive upward and downward, respectively, the legs 14 and the legs 17 of all of the cores in the register, the amplitude of the advance pulse being sufficient to cause flux switch about the central hole 11. Since the flux in each of the legs 14 and 17 of each core in the register is already in a direction urged by this advance pulse, only insignificant shuttle pulses are produced thereby. At this juncture in the operation, stage $S_1$ includes the "1" flux pattern as shown in FIG. 2*a*; the remaining stages are still clear. A first phase of operation has now been concluded.

Subsequently, usually shortly after the advance and input pulse sources are activated, the prime pulse source 23 is activated, also under the control of control circuit 26. In this connection, the prime pulse source 23 may comprise any unipolar pulse source capable of providing pulses for providing the flux changes required in accordance with this invention. As is conventional, the prime pulse source is limited to producing prime pulses of amplitudes less than that required to switch flux about a central hole 11 of a core. Prime pulse source 23 produces a prime pulse in conductor 22 which pulse tends to drive upward the flux in the legs 15 and 17 of all the A and B cores. Since the prime pulse is limited in amplitude, flux closure for flux switched in response to this pulse is counterclockwise around a radial hole. Inspection of the clear state illustrated in FIG. 2*a* shows that flux closure counterclockwise about radial hole 13 is not possible because leg 16 already is saturated in the direction urged by the prime pulse. Also, the flux in leg 15 already is directed upward. Accordingly, a core in the clear state exhibits only insignificant shuttle pulses in response to the current produced in conductor 22 by prime pulse source 23. Core $A_1$, however, is in the information condition, shown in FIG. 2*a*, as a result of the input pulse in conductor 18 previously applied by the input pulse source 19. Core $A_1$ has the available paths for flux closure. Accordingly, the flux pattern in core $A_1$ changes from that shown in FIG. 2*a* to that shown in FIG. 2*c* in response to the pulse in conductor 22. Consequently, as previously stated, the prime pulse has switched only the core in the information condition.

A second phase of operation is now concluded. As a result, the two-phase cycle of operation of the circuit of FIG. 1 is realized, a "1" having been stored in stage $S_1$ and, subsequently, primed. Further operation of the shift register of FIG. 1 proceeds by repetition of the above-described two phases of operation. Specifically, further information is introduced into the register and, simultaneously, information already in the register is advanced therethrough by alternating the advance phase and the prime phase.

A binary "0" is stored subsequently in the register by activating, simultaneously, input source 19 and advance pulse source 21 again under the control of control circuit 26. The input pulse source produces an input pulse, this time of negative polarity, in conductor 18 which, because of the difference in polarity, now drives downward leg 15 of core $B_1$ providing therein an information condition as shown in FIG. 2*b*. The input pulse also tends to drive upward the flux in leg 15 of core $A_1$ leaving core $A_1$ primed as shown in FIG. 2*c*. Simultaneously, the advance pulse source 20 urges the legs 14 and 17 of all the cores toward directions consistent with the clear state as shown in FIG. 2*a*. Naturally, those cores already in the clear state exhibit only insignificant flux shutting in response to this pulse. Core $A_1$, however, is in the primed condition shown in FIG. 2*c*. Consequently, core $A_1$ switches to the clear state in response to this advance pulse, flux in leg 14 thereof switching from the downward to the upward direction, flux in leg 17 thereof switching from the upward to the downward direction in the process. Accordingly, the advance pulse switches only the primed cores.

This switching of flux in leg 17 of core $A_1$ induces a voltage in transfer loop $TL_{12}$. This induced voltage tends to drive the flux in leg 17 of core $B_1$ downward. The flux in leg 17 of core $B_1$ already is directed downward, however, and only insignificant flux shuttling results therein. This induced voltage in transfer loop $TL_{12}$ also tends to drive the flux in legs 15 of cores $A_2$ and $B_2$ downward and upward, respectively. The flux in leg 15 of core $A_2$ is, at this time, directed upward because core $A_2$ is in the clear state. Consequently, the flux in this leg switches and core $A_2$ is placed in the information "1" condition shown in FIG. 2*a*. The flux in leg 15 of core $B_2$ also is directed upward, at this time, and, accordingly, the leg is driven further into saturation as a result of the pulse induced in the transfer loop $TL_{12}$ in response to the advance pulse. Thus, the destination of the information in the transferee stage is determined by the transfer loop and the senses by which it couples the various cores. Now a binary "1," as shown in FIG. 2*a*, is stored in stage $S_2$ and a binary "0," as shown in FIG. 2*b*, is stored in stage $S_1$. The following primed phase drives the information bearing cores $A_2$ and $B_1$ into the primed condition shown in FIG. 2*c*, while not essentially affecting the remaining cores which remain in the clear state as described in connection with the previous prime phase.

For storing an additional "1" in the register, the input pulse source 19 and the advance pulse source 21 are again activated. The input pulse provides a "1" in stage $S_1$ as described previously in connection with the introduction of the initial "1" into the register. The advance pulse simultaneously switches upward and downward, respectively, legs 14 and 17 of primed cores $B_1$ and $A_2$ only while producing insignificant flux shuttling in the remaining cores. The switching of leg 17 of core $B_1$, however, induces a voltage in transfer loop $TL_{12}$. This voltage is of a polarity to drive the flux in leg 17 of core $A_1$ downward, and the flux in legs 15 of cores $A_2$ and $B_2$ upward and downward, respectively, as described previously in connection with the introduction of a "0" to the register. The advance pulse, however, already has driven downward the flux in the legs 17 of all the cores in the register not already in that condition. Accordingly, core $A_1$ experiences only insignificant shuttle pulses as a result of the pulse in the transfer loop $TL_{12}$ at this time. The flux in legs 15 of core $A_2$ is already directed upward because the core is in the clear state at this time. Thus, only shuttle pulses are induced therein as a result of the induced voltage in transfer loop $TL_{12}$, and core $A_2$ remains in a clear state. The core $B_2$, also is in the clear state and the flux in its leg 15 is directed upward. Accordingly, leg 15 of core $B_2$ is driven downward and the core, consequently, is driven to the information condition. Thus, stage $S_2$ is in the "0" state shown in FIG. 2*b*, the destination of the information having again been determined by the transfer loop.

The switching of leg 17 of core $A_2$ similarly induces a voltage in transfer loop $TL_{23}$. This voltage is of a polarity to drive flux in leg 17 of core $B_2$ downward, and the flux in legs 15 of cores $A_3$ and $B_3$ downward and upward, respectively. The flux in leg 17 of core $B_2$ already is directed downward, and, accordingly, only insignificant shuttle pulses result. Legs 15 of both cores $A_3$ and $B_3$, however, are directed upward, both cores being in the clear state. Accordingly, the flux in leg 15 of core $A_3$ is switched downward while the flux in leg 15 of core 15 of core $B_3$ is merely shuttled. Consequently, core $A_3$ is driven to the information condition and core $B_3$ remains in the clear state, providing in stage $S_3$, a binary "1" as shown in FIG. 2*a*, again, the destination of the information having been determined by the transfer loop.

In three cycles of operation each including an advance and a prime phase, the information 1, 0, 1 has been introduced successively to the initial stage of the register and advanced in turn. During each advance phase, the input pulse introduced information to the leg 15 of one or the other core of stages $S_1$ urging the remaining core to the clear state. At the same time, the advance pulse drive legs 14 and 17 in a direction which required the legs 14 and 17 of primed cores to switch but left cores in the clear stage unchanged. Each leg 17 switching back toward the clear state in response to the advance pulse induced a voltage in the transfer loop to which it was coupled. The induced voltage, in turn, introduced information to the leg 15 of one or the other core of the next succeeding stage, urging the remaining core of the next succeeding stage toward the clear state. At the same time back propagation of information was avoided by driving flux in the coupled leg 17 of the other core in the transferor stage, also coupled by the transfer loop, toward a direction in which it is already saturated. Thus, the operation as described earlier has been fully realized, binary "1's" and "0's" being constrained to the rails $R_1$ and $R_0$, respectively, once introduced therein.

The introduction of additional bits of information proceeds as described above, the ultimate destination of the first bit of information after the introduction of *n* bits to the register, being a core of stage $S_n$ as determined by the transfer loop $TL_{3n}$. The introduction of the $(n+1)$th bit of information activates the utilization circuit 25. Since a "1" is the first bit introduced, it will also be the first read out. Accordingly, the introduction of the $(n+1)$th bit and the advance pulse simultaneous therewith switches downward the flux in leg 17 of core $A_n$ inducing a positive pulse in utilization circuit 25. Had a "0" been introduced as the initial bit, the flux in leg 17 of core $B_n$ would have switched inducing a negative pulse in utilization circuit 25. It will be appreciated that the polarities of the input and output pulses described may be reversed by reversing the senses of conductor couplings, as is well known.

Although the invention has been described in terms of a shift register including a prime pulse source connected to a conductor 22 of FIG. 1, the prime pulse may be coupled directly to the conductor connected to the advance pulse source thus obviating conductor 22. This arrangement is shown schematically in FIG. 3 wherein the prime pulse source 23 is shown connected directly to conductor 20 by means of conductor 22*a*. FIG. 3 shows only the connection of the circuit to the core $A_1$. The remainder of the circuit and its function are entirely as described previously and needs no further description. It is noted here that in order for the prime pulse source to produce, in this arrangement, the flux changes described hereinbefore, it provides pulses of a polarity opposite to that provided by the prime pulse sources in the previous embodiment. Accordingly, here, as described previously, the input and advance pulse source may be any bipolar and unipolar pulse source respectively capable of providing the pulses required in accordance with this invention. The prime pulse source, however, may be any unipolar pulse source capable of providing pulses of a polarity opposite to that required thereof by the previous illustrative embodiment. It is also well known that the typical prime pulse in shift register operation is of long duration and may originate from a conventional direct current source.

What has been thus described is considered to be only an illustrative embodiment of this invention. Accordingly, various and numerous other arrangements may be devised by one skilled in the art without departing from the spirit and scope of this invention. For example, it will be apparent to one skilled in the art to modify the input and/or the utilization circuits for series-parallel, parallel-series, and parallel-parallel operation.

What is claimed is:

1. A shift register circuit comprising a plurality of stages including an initial stage, each of said stages comprising first and second multiapertured magnetic cores having substantially rectangular hysteresis characteristics said first multiapertured magnetic core being responsive to input signals of a first polarity only, said second multiapertured magnetic core being responsive to input signals of a second polarity only, input means coupled to said first and second multiapertured magnetic cores of said initial stage for applying signals of first and second polarities thereto, a plurality of transfer loops each coupling the first and second multiapertured magnetic cores of a different pair of adjacent stages, and a single advance circuit including a single conductor coupling in a like manner all of said first and second multiapertured magnetic cores, each multiapertured magnetic core being coupled by a transfer loop and said single conductor in a sense to permit, when said single conductor is activated, the transfer of information between the coupled multiapertured magnetic cores of each pair of adjacent stages responsive to signals of said first polarity while urging to a clear state the remaining coupled multiapertured magnetic cores of said pair of adjacent stages.

2. A shift register circuit comprising a plurality of stages including an initial and a terminal stage, each of said plurality of stages including first and second magnetic cores, each of said cores having substantially rectangular hysteresis characteristics, said first core being responsive to positive input pulses only and said second core being responsive to negative input pulses only, bipolar input means coupled to said first and second cores of said initial stage for selectively introducing, when activated, information into said first and second core of said initial stage, priming means coupled to each first and second core of said plurality of stages to switch, when activated, only the information bearing first and second cores of said plurality of stages, advance means including a single conductor coupled in a like manner to each first and second core of said plurality of stages for switching, when activated, only the primed information bearing first and second cores of said plurality of transfer loops responsive to said advance means, each coupling the first and second cores of a different pair of adjacent ones of said plurality of stages to transfer, when activated, information from a primed information bearing core of one stage to the corresponding core of the next adjacent stage, control means for activating said priming and said advance and input means alternately, and bipolar utilization means coupled to said first and second cores of said terminal stage.

3. A shift register in accordance with claim 2 wherein each of said first and second magnetic cores is apertured to include an input leg, first and second intermediate legs, and an output leg.

4. A shift register in accordance with claim 3 wherein said input means couples serially in opposing sense the first intermediate leg of said first and second cores of said initial stage, the priming means is coupled serially in like sense to the first intermediate and output legs of each of said first and second cores of said plurality of stages successively, the advance means is coupled serially in an alternating sense to the input and output legs of each of said first and second cores of said plurality of stages successively, and wherein each of said transfer loops couples serially, in opposing sense, the output legs of the first and second cores of one of said plurality of stages with the first intermediate leg of the first and second cores of the next adjacent one of said plurality of stages.

5. A shift register circuit in accordance with claim 3 wherein said input means couples serially, in opposing sense, the first intermediate leg of said first and second cores of said initial stage, the priming means and the advance means are coupled serially, in an alternating sense, to the input and output legs of each of said first and second cores of said plurality of stages successively, and wherein each of said transfer loops couples serially, in opposing sense, the output leg of the first and second cores of one of said plurality of stages with the first intermediate leg of the first and second cores of the next adjacent one of said plurality of stages.

References Cited by the Examiner

UNITED STATES PATENTS 3,195,117 7/1965 Engelbart ___________ 340—174

BERNARD KONICK, *Primary Examiner.*

TERRELL W. FEARS, S. M. URYNOWICZ, *Assistant Examiners.*